F. COATES.
BOX LABELING MACHINE.
APPLICATION FILED JAN. 30, 1909.
940,674.
Patented Nov. 23, 1909.
8 SHEETS—SHEET 1.
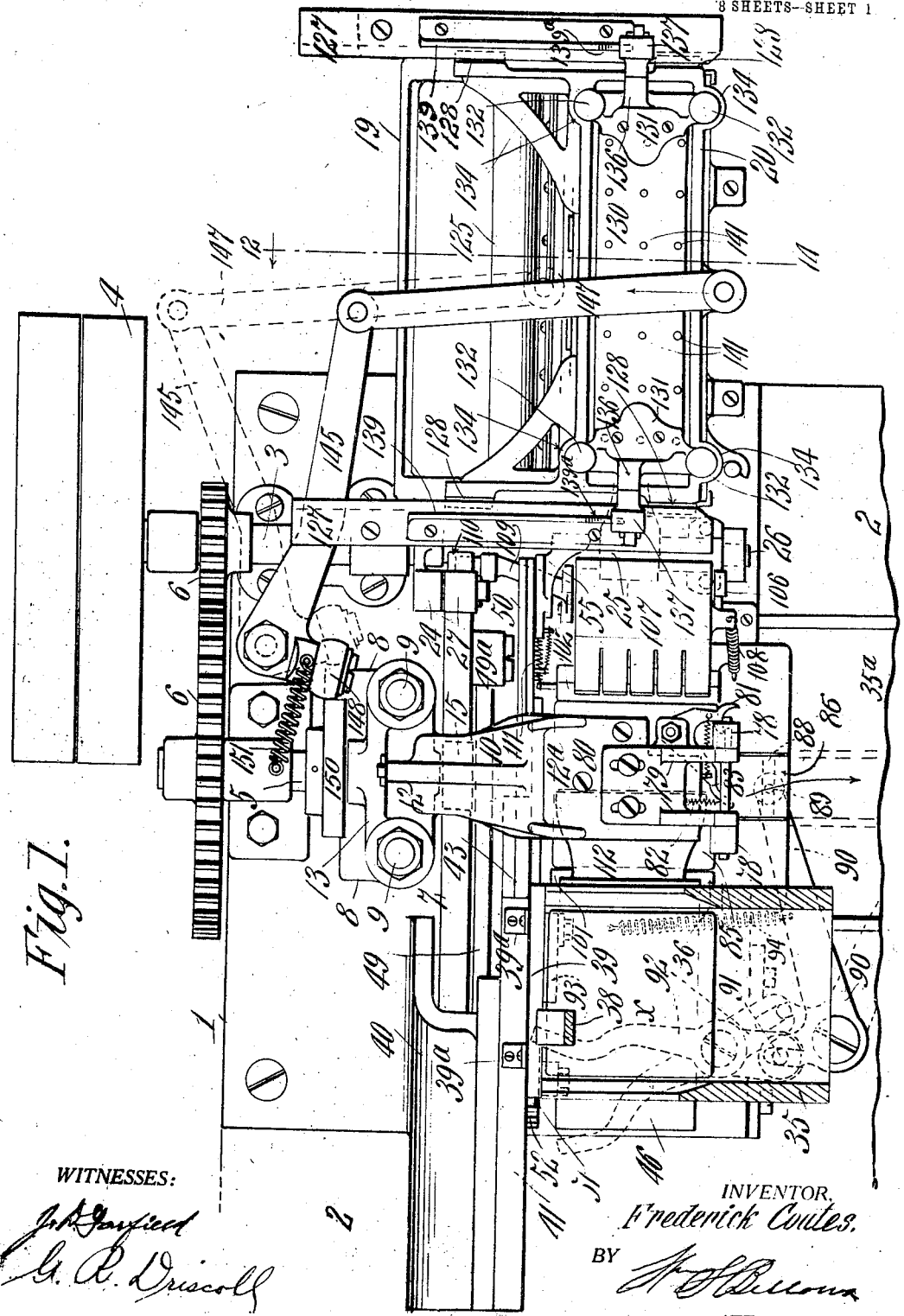
Fig. 1.
WITNESSES:
J. A. Garfield
G. R. Driscoll
INVENTOR.
Frederick Coates.
BY
ATTORNEY.

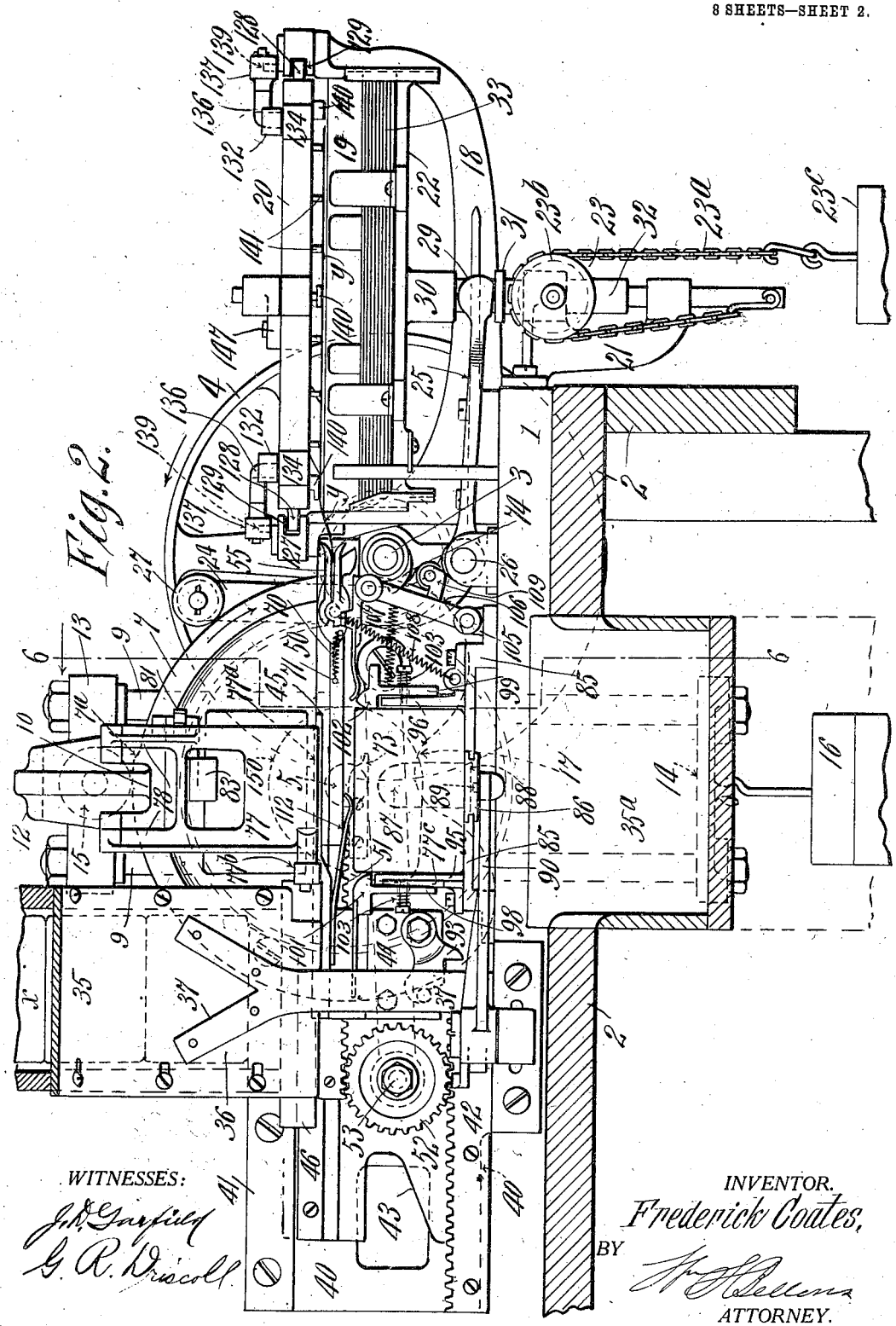

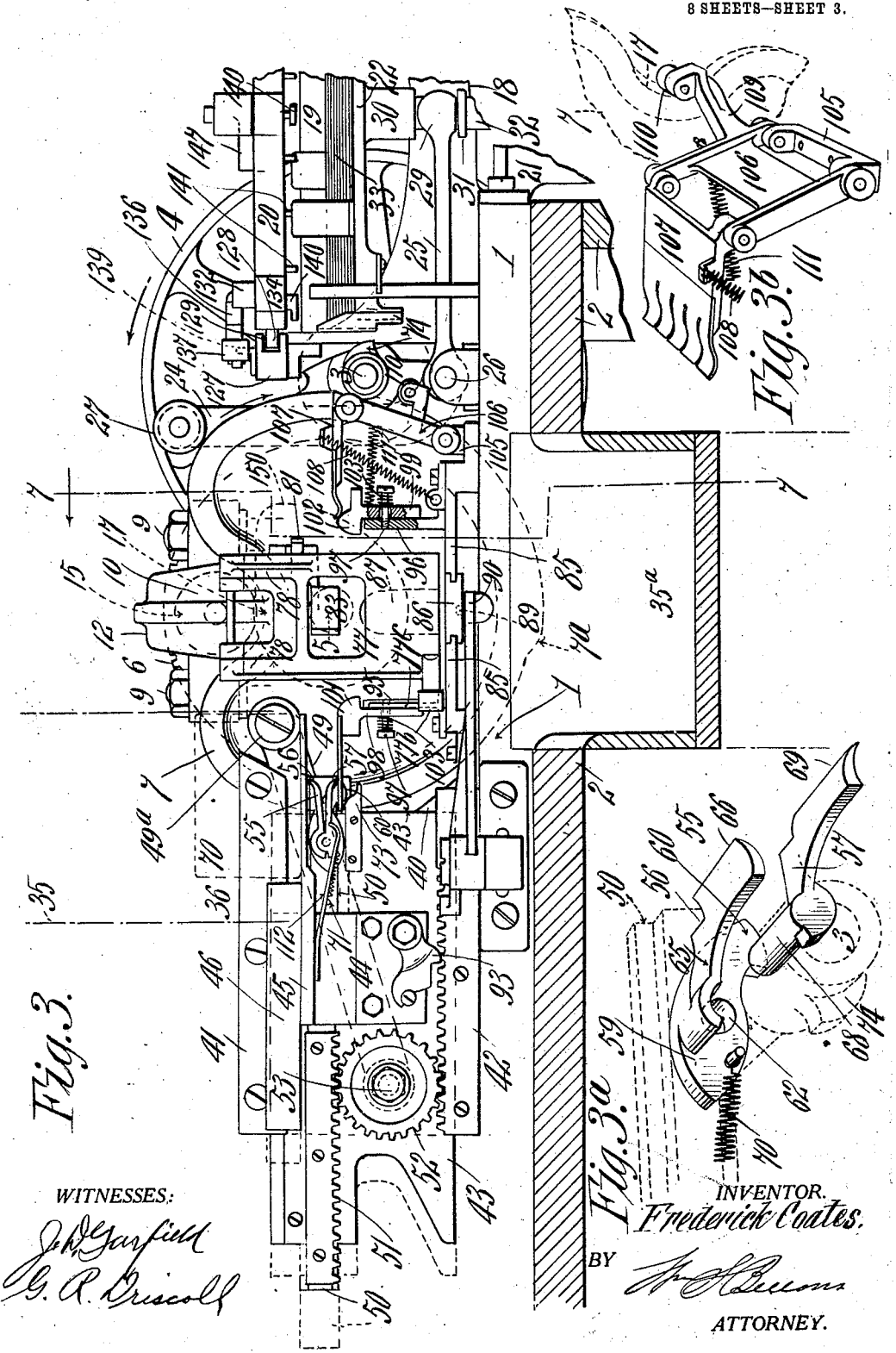

F. COATES.
BOX LABELING MACHINE.
APPLICATION FILED JAN. 30, 1909.
940,674.
Patented Nov. 23, 1909.
8 SHEETS—SHEET 4.
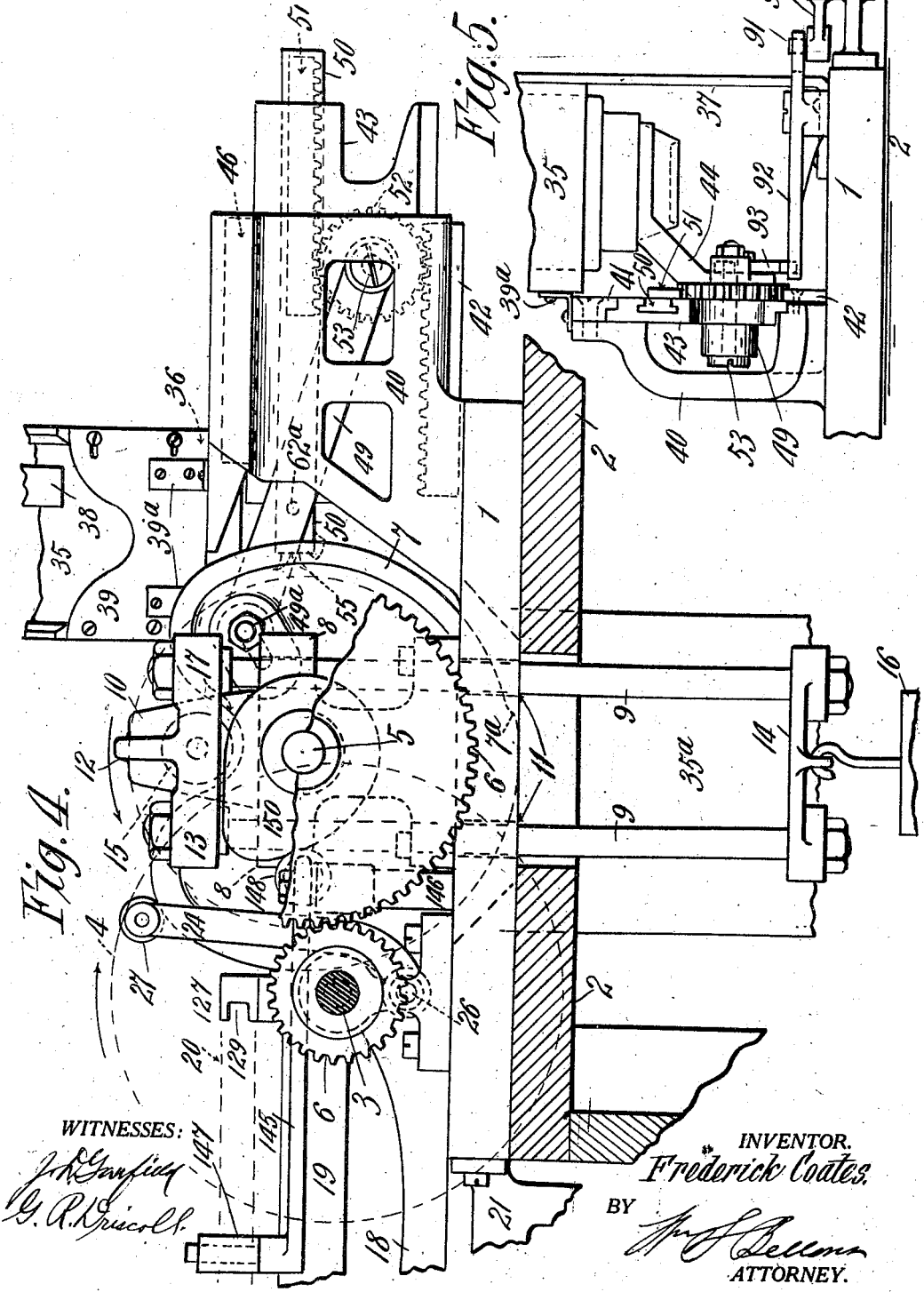
WITNESSES:
INVENTOR.
Frederick Coates.
BY
ATTORNEY.

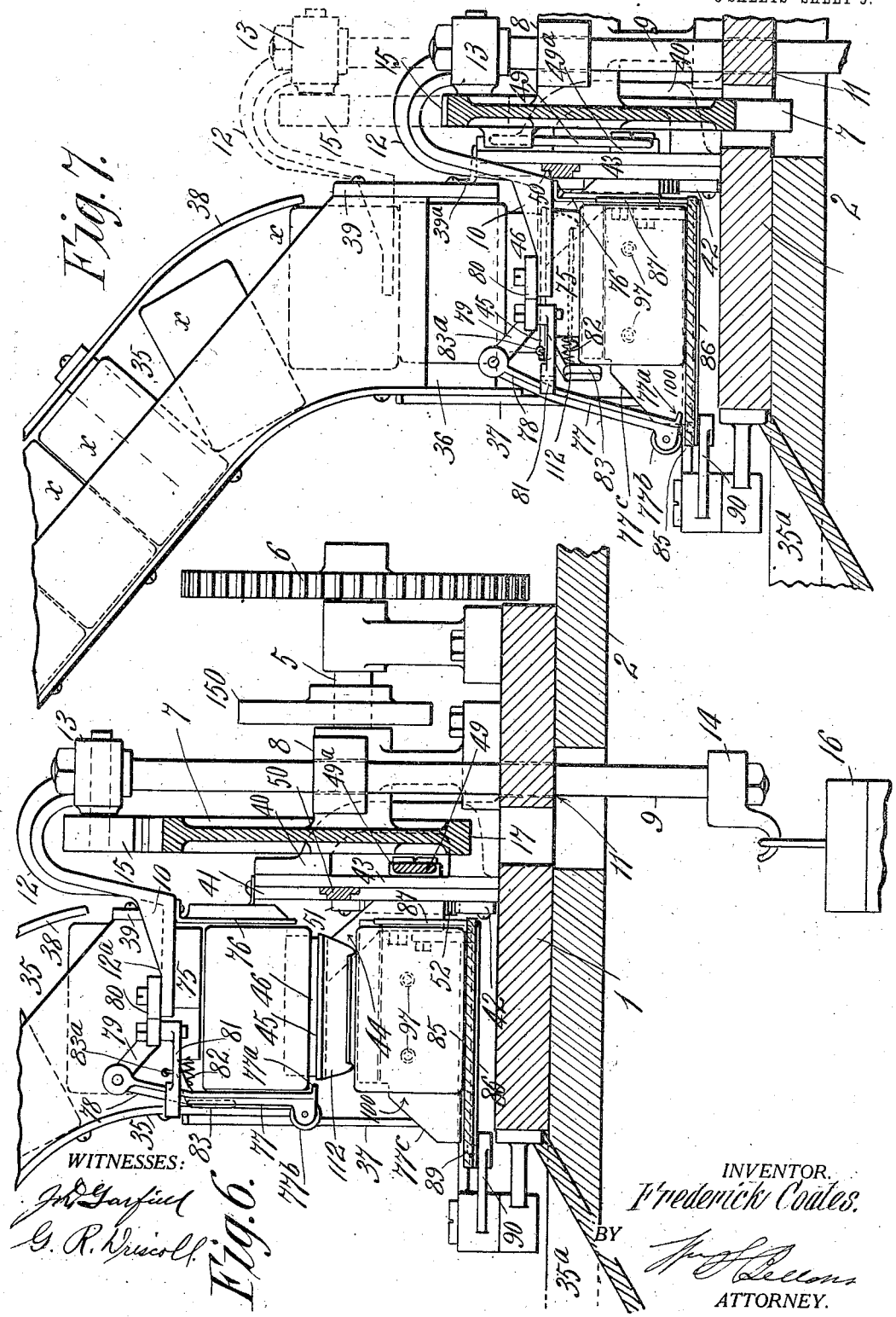

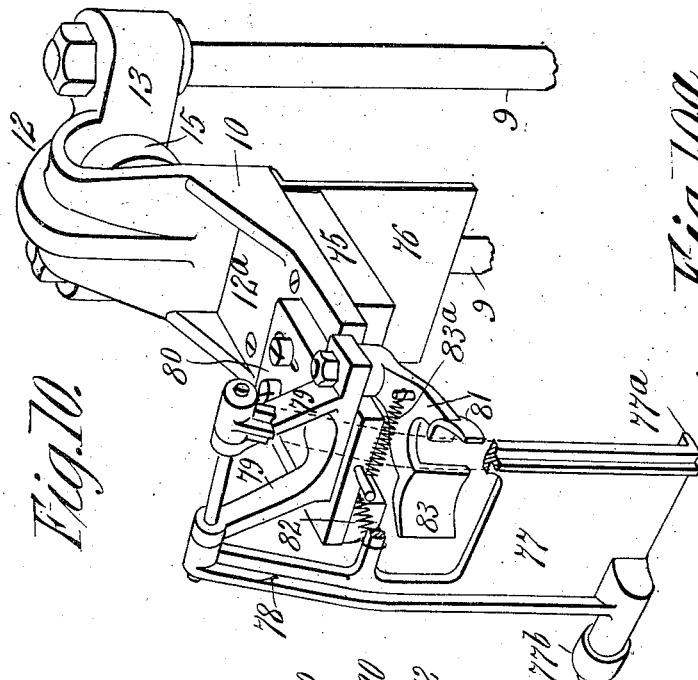
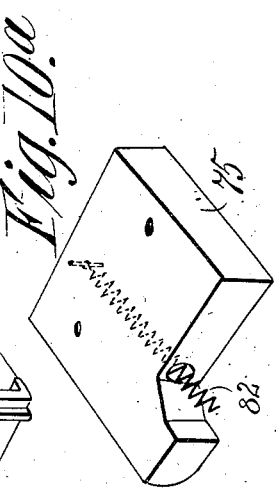
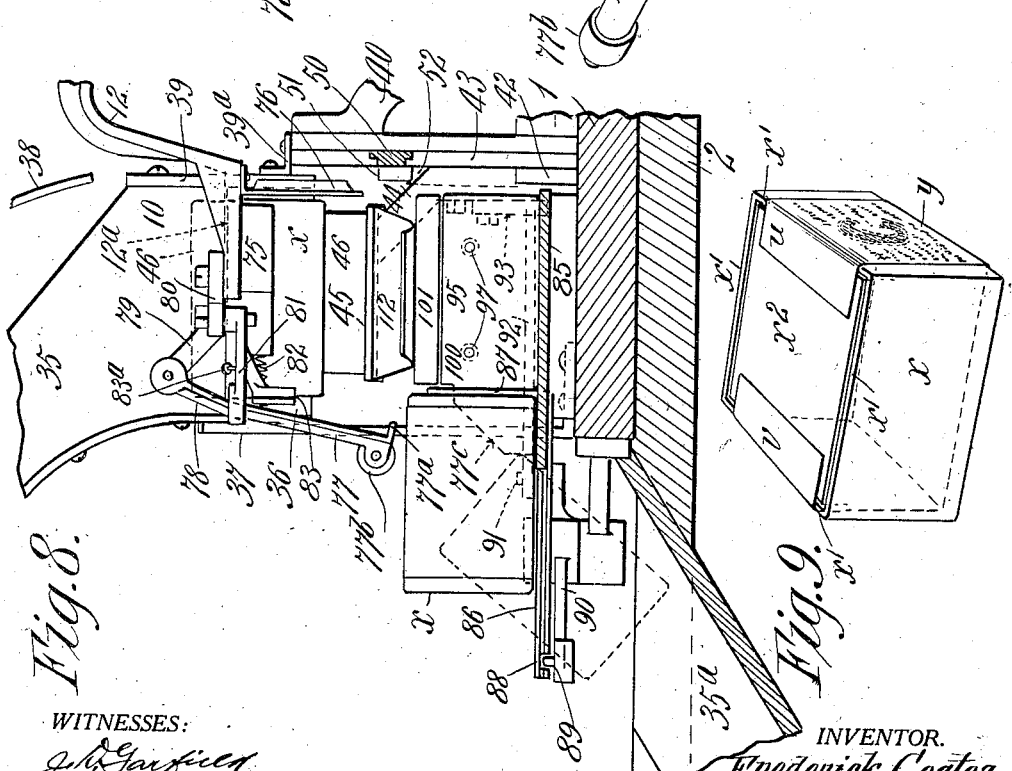

F. COATES.
BOX LABELING MACHINE.
APPLICATION FILED JAN. 30, 1909.
940,674.
Patented Nov. 23, 1909.
8 SHEETS—SHEET 7.
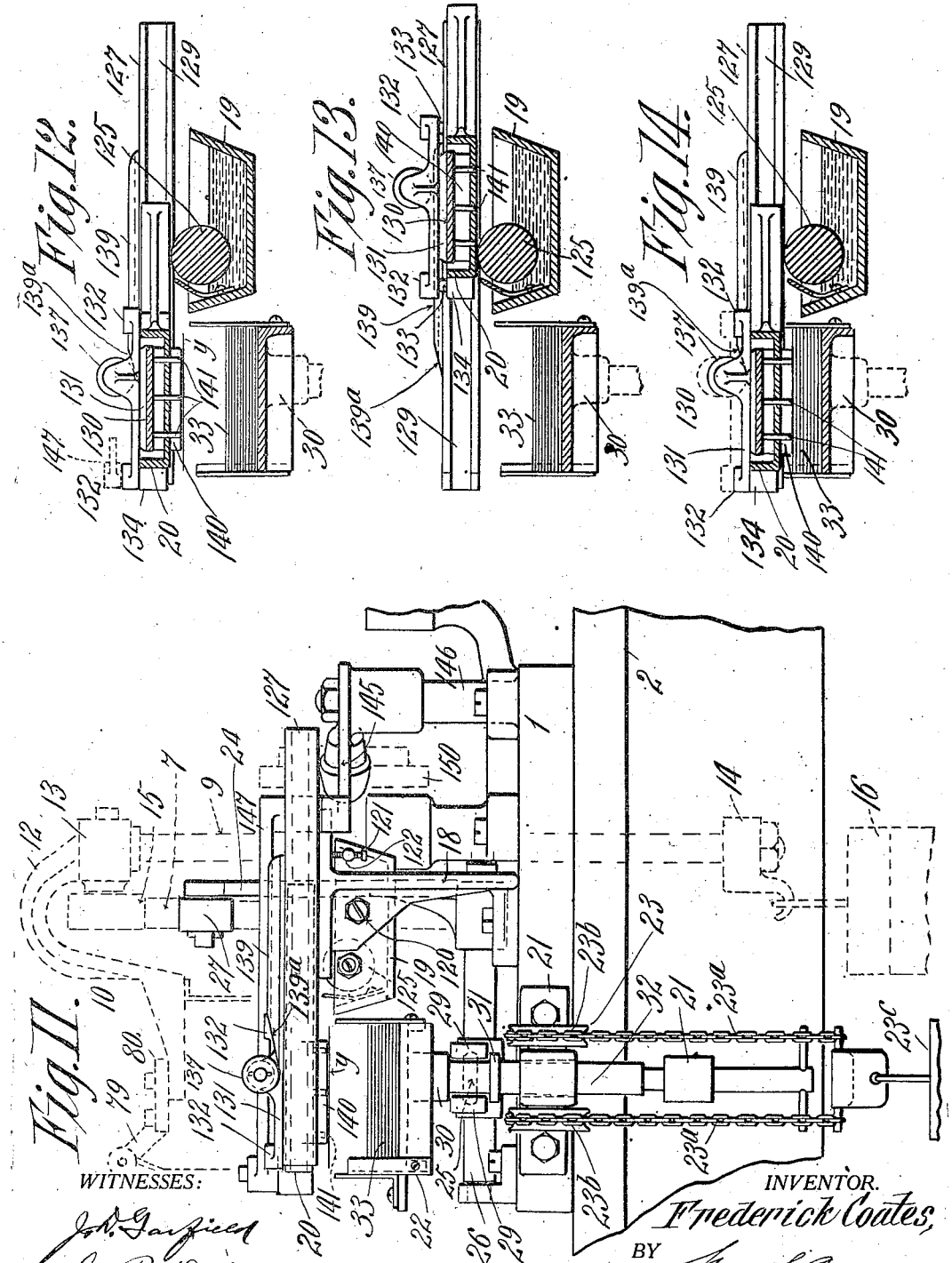
WITNESSES:
INVENTOR.
Frederick Coates,
BY
ATTORNEY.

F. COATES.
BOX LABELING MACHINE.
APPLICATION FILED JAN. 30, 1909.
940,674.
Patented Nov. 23, 1909.
8 SHEETS—SHEET 8.
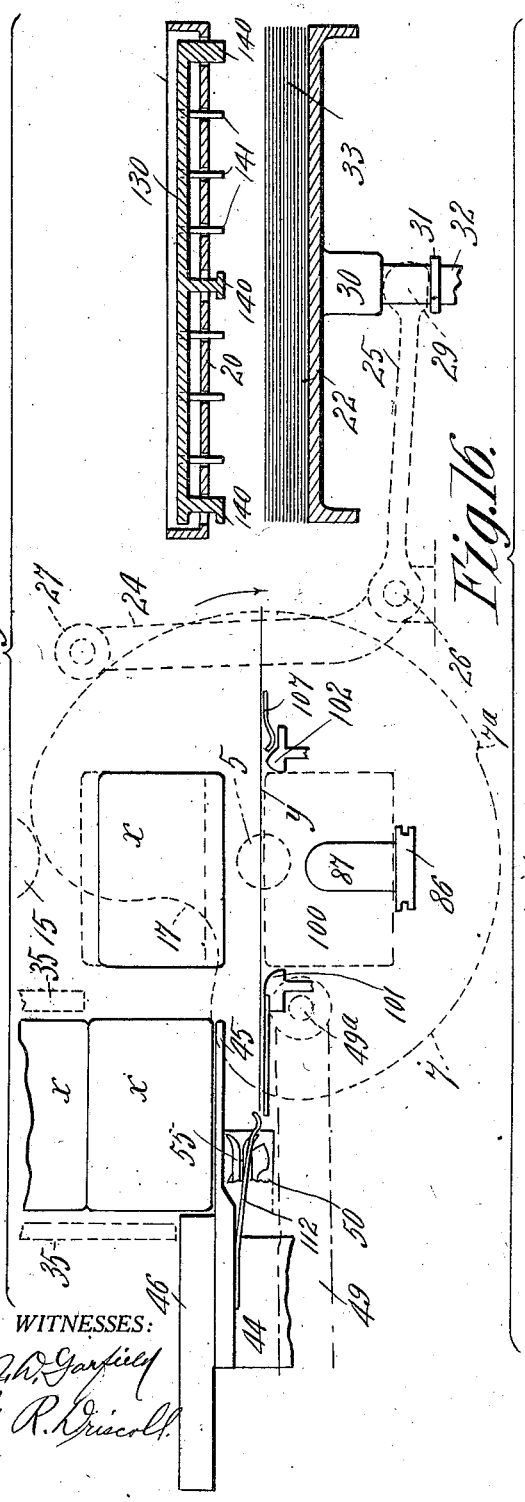
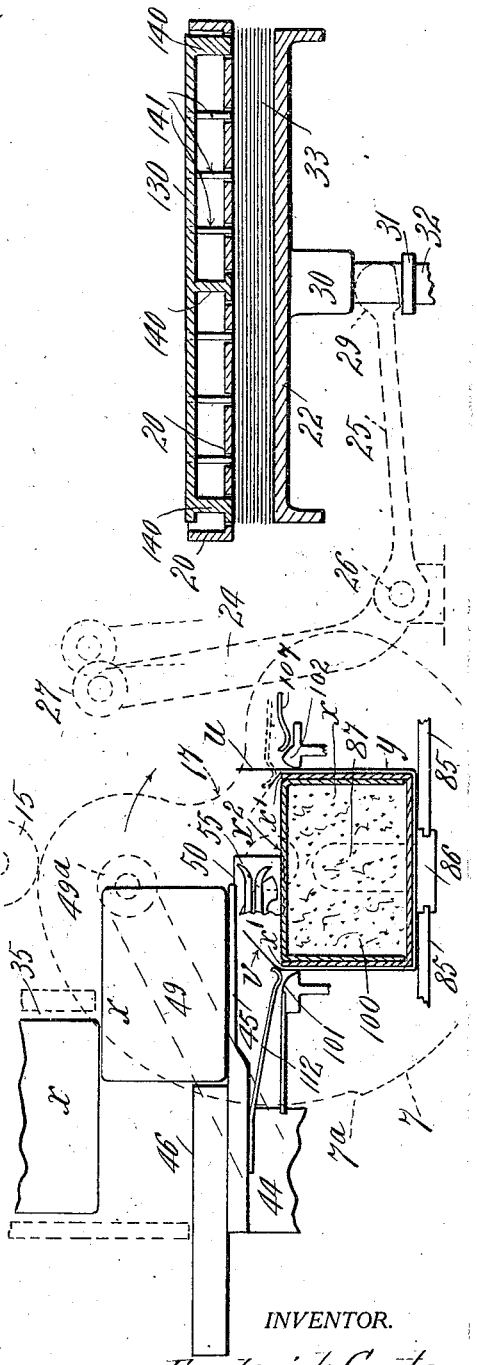
WITNESSES:
INVENTOR.
Frederick Coates.
BY
ATTORNEY.

UNITED STATES PATENT OFFICE.

FREDERICK COATES, OF SPRINGFIELD, MASSACHUSETTS.

BOX-LABELING MACHINE.

940,674.

Specification of Letters Patent.  Patented Nov. 23, 1909.

Application filed January 30, 1909.  Serial No. 475,281.

*To all whom it may concern:*

Be it known that I, FREDERICK COATES, a citizen of the United States of America, and resident of Springfield, in the county of Hampden and State of Massachusetts, have invented certain new and useful Improvements in Box-Labeling Machines, of which the following is a full, clear, and exact description.

This invention relates to improvements in a machine for encircling or partially encircling a box or like object with a pasted label and for causing a pressing of the label onto the box, whereby it becomes adherent thereto and constitutes a partial wrapping and sealing for the box.

The machine in which this invention resides comprises a receiver into which boxes are to be successively brought, a feed shelf movable over and away from over the receiver, means for guiding boxes onto the feed shelf, a carrier into which the boxes are successively delivered by the feed shelf and which conveys them downwardly into the receiver, devices for supporting a pile of blanks or labels to one side of the box receiver, means for manipulating the blanks whereby they are successively pasted and separated one by one from the supply pile, means for carrying a label across the top of the receiver and under a box to be next brought thereinto, devices for overturning the upstanding portions of the label onto the top of the box when the same, with the label, shall have been carried downwardly into the receiver and for pressing the label onto the box, and means for the expulsion of the box, wrapped and sealed, by the label, from the machine.

The invention furthermore comprises constructions of certain of the devices or mechanisms forming components of the machine, and also other and various combinations and arrangements of devices and parts; and all substantially as hereinafter described in conjunction with the accompanying drawings and set forth in the claims.

In the drawings:—Figure 1 is a plan view of the complete machine shown as mounted upon an ordinary work table or bench; Fig. 2 is a front elevation, with a portion of the table and box guiding hopper in vertical section, the various working parts of the machine being shown in the same relative positions as in Fig. 1; Fig. 3 is also a front elevation similar to Fig. 2, except that the various working parts are in different relative positions. Fig. 3$^a$ is a perspective view of the gripper mechanism for the label, the parts thereof being shown in separated relations to each other; Fig. 3$^b$ is a perspective view of one of the label folding plates and actuating appurtenances; Fig. 4 is a rear elevation of a portion of the machine, the position of the parts thereof being the same as in Fig. 3; Fig. 5 is a partial end elevation as taken at the left hand end of the machine; Fig. 6 is a vertical cross section of the machine, taken on line 6—6, Fig. 2; Fig. 7 is a similar cross section but showing the position of the parts in the same position as in Fig. 3, and is taken on a line 7—7, Fig. 3; Fig. 8 is still another cross section taken on the same plane as Figs. 6 and 7, but showing a third position that the parts assume; Fig. 9 is a perspective view of a box, such as is within the capability of this machine to label and seal, the box being represented as having been labeled and sealed; Fig. 10 is a perspective view of the box carrier; Fig. 10$^a$ is a perspective view of a detachably connected block or portion comprised in the box carrier; Fig. 11 is an end elevation of a portion of the machine as seen at the right hand end thereof, principally showing the blank or label elevator, and the label pasting mechanism; Figs. 12, 13, and 14, are sectional views of the label pasting devices, showing the parts thereof in different positions, the plane of section being indicated by line 12—14, Fig. 1; Figs. 15 and 16 are diagrammatic views showing in front elevation some of the coacting parts of the machine in positions they assume at different stages of labeling and sealing a box.

Similar characters of reference indicate corresponding parts in all of the views.

In the drawings, 1 is the bed-plate, or base of the machine, on which all of the coacting parts for the various operations of pasting and moving the supplied labels, conveyance of the boxes, and wrapping of the labels, thereon, are mounted. The advantage of portability of the machine as a whole is thus attained and permits of its being operatively secured to an ordinary work-table 2, as shown in the drawings, or if desired, on a specially provided frame or standard. A driving shaft 3 is mounted above the bed in bearings adjacent the right hand end thereof. (For purposes of description, the front of the machine will be assumed to be that shown in elevation in Figs. 1 and 2.) A driving pulley 4 on shaft 3 is located thereon at a point beyond the rear edge portion of the bed 1. A cam shaft 5 is mounted in bearings centrally located relatively to the bed 1, and slightly higher above the bed than the shaft 3, and is driven from shaft 3 at a reduced speed by the intermeshing spur gears 6, 6, Figs. 1 and 4. The cam shaft 5 extends from the rear of the bed 1 to a point somewhat less than half way across the latter, and has secured on its end portion the large cam 7.

One of the bearing supports of the cam shaft 5 is formed with extended side bearings 8 through which are guided the vertical and parallel guide rods 9 of the box carrier 10. The rods 9 are further closely guided in the perforations 11 in the bed 1, directly beneath and in accurate vertical alinement with the slide-ways in the side bearings 8. The upper end portions of the guide rods 9 carry the yoke-portion 12 of the box-carrier 10, the upper ends of the rods being secured to the cross head portion 13 of yoke 12, as seen in Figs. 1, 4 and 6. The lower end portions of the rods 9 are held in parallel relations to each other by the cross bar or tie 14. The upper cross head 13 uniting the guide rods has mounted thereon a cam-roller 15 in a position above and in the path of cam 7 by which it is engaged, and by which, intermittently, upward movements of the box carrier 10 are imparted. The lower cross bar 14 has, hooked thereto, a counter-weight 16 whose downward force causes cam-roller 15 to peripherally engage cam 7, and also provides for a gravity operated downward movement of the box-carrier 10, as insured by the depression or low portion 17 of the cam 7.

Referring to Fig. 2 of the drawings,—the right hand side of the bed 1 has secured thereto and extending outwardly therefrom the supporting frame 18 for the stationary paste-dish 19 and the slidable paste-applying platen 20. A bracket 21, also secured to the right hand edge portion of bed 1, guides the label-elevator 22. This label elevator is moved upward periodically to bring the topmost label of a pile 33 carried thereon into engagement with the paste applying platen 20 by a gravity operated device 23 which consists of two parallel chains 23ᵃ which are attached each by one end to the plunger shaft 32, and pass upward and over the grooved wheels 23ᵇ and thence downward, the pendent portions having a weight 23ᶜ hook-supported thereon. The means provided for moving the elevator 22 downward and for maintaining it in its lowered position for a prolonged period, and against the upward tendency of the gravity device 23 is by means of the cam operated levers 24 and 25. The cam lever 24 is mounted on the rock-shaft 26 and extends upward, its upper end portion being provided with the cam-roller 27 which is in line with the path of movement of the working edge of the cam 7. The horizontally extending lever 25 is secured on the rock shaft 26 and projects outwardly therefrom, its free end being provided with a forked extension, the bifurcated ends 29 of which are rounded and engage the underside surface of the hub 30 of the elevator 22, on either side thereof, as seen in Figs. 2 and 11, while the flattened underneath sides of the fork ends 29 are engaged by the collar 31 on the upwardly, gravity operated elevator plunger shaft 32, and transmit the said gravity pressure through the levers 24, 25, and cause the cam-roller 27 to rest with considerable pressure against the high parts of cam 7; but on the presentation of the low points in the depression 17 of the cam 7 opposite the cam roller 27, said cam roller swings into the said depression 17, and the gravity device 23 instantly operates to raise the elevator 22 upwardly until the top of its pile of labels 33 contacts with the paste-applying platen 20, the period of this contact of the label pile 33 with the platen 20 being of brief duration compared with the time the said parts are out of engagement, as will be understood by a reference to Figs. 15 and 16, especially in respect of the shape of cam 7 as seen in dotted lines in the said figures.

The boxes or articles which, irrespective of size or form (within reasonable limits), it is within the capability of this machine to properly and rapidly label and seal, are many and various; but for the purpose of illustration, the form of box shown in the drawings and as best seen in Figs. 9 and 16, is the ordinary telescoping form of pasteboard box in which a deep cover entirely incloses the inside box. The boxes properly filled, with their covers on, are fed into the machine (preferably) in an inverted position, as seen in section in Fig. 16, and the manner of conveying the filled and inverted boxes x, to and into the labeling position in the machine will now be described.

A trough or chute 35 consisting of a sheet metal bottom and wooden sides, extends angularly downward from a suitable height above the bed of the machine, the upper or receiving end of the chute being connected to an elevated platform or table (not shown) on which a supply of filled and closed boxes may be deposited by a helper, within convenient reach of the machine operator who in turn places the boxes in the upper portion of the chute in such a manner that they slide downwardly and into the vertical lower or delivery end 36 in superposed relation to each other, as shown in Fig. 7, and other figures of the drawings.

The lower portion of the chute 35 is supported and held in rigid relation to the machine by the vertical post 37, the lower limb of said post being secured to the bed 1 and the upper forked end portion is secured to the sheet metal portion of the chute near the lower end of the latter. (See Figs. 2 and 7.) The rear or open side of the chute has a guide strap 38 supported in a position thereover to prevent the boxes in their downward slide within the chute from displacement therefrom. The rear portion of the lower vertical end portion of the chute is closed by a vertical wall 39 and further support of the lower end of the chute relative to the machine is had by the small angle straps 39ᵃ which are secured each by one member to the wall 39 of the hopper and by the other to a heavy flange or rib 40, integral with the bed 1. This flange or rib as best seen in Figs. 4 and 5 of the drawings, constitutes in connection with the gib 41 and the rack-tooth provided gib 42, a guideway for the box feeding slide plate 43. Attached to the slide plate 43 is a bracket 44 supporting the box receiving shelf 45. This shelf 45 or some portion of it is always under the open lower end of the chute 35. A block 46, adjustably secured to shelf 45 receives on its upper face the lower box of a quantity or column as it reaches the outlet end 36 of the chute.

The slide-plate 43 is adjustably connected to the cam by the bar or link 49 which at one end has stud and slot engagement with the cam as seen at 49ᵃ, and which at its other end has pivoted connection with the slide plate by means of the stud 53; and on the rotation of the said cam a reciprocating motion is imparted to the slide-plate 43. By referring to Fig. 15, which represents the extreme outward movement to the left of the block 46 understood as carried by the side plate, it will be seen that in this position the shelf-block 46 has moved to the left of the downwardly fed column of boxes within the chute 35, and is in position to push the lower box of the column into the box carrier 10.

An important adjunct of the slide-plate 43 (for carrying boxes from the chute outlet to the box-carrier 10) is a gripper slide 50,—for grasping and feeding a label,— which, as seen in end view in Fig. 5, in face view in Figs. 1 and 2, and in section in Figs. 6, 7 and 8, consists of a long cross sectionally T-shaped bar mounted to move within a grooved T-shaped way in slide-plate 43. On the left hand end portion of the gripper slide 50 and secured on the face thereof is the rack 51, which is engaged by the uppermost teeth of the spur gear 52 (see Figs. 2 and 3, and in dotted line in Fig. 4, and in edge view in Fig. 5). This gear 52 is mounted on the aforementioned stud 53, which passes through the link 49 and slide-plate 43. The lowermost teeth of gear 52 engage the stationary combined gib-and-rack 42.

The operation of the gear 52 in connection with the gripper slide 50 (when the former is moved horizontally in consonance with the slide plate 43 by the cam connecting lever 49) is as follows:—The lower teeth of the gear being engaged with the stationary rack 42, the horizontal movements given it in common with slide plate 43 produce a rolling action thereof, and causes the uppermost teeth which are in engagement with the gripper-slide rack 51 on the gripper-slide 50 to propel that slide at a speed, double the speed of the slide plate 43 on which the gear 52 is mounted. The right hand end portion of the gripper-slide 50 has mounted thereon the spring closed gripper 55 (see Figs. 1, 2, 15 and 16, and also Fig. 3ᵃ), in which latter view the two members 56 and 57 which united form the complete gripper, are shown in separated relations.

Referring to Fig. 3ᵃ, the member 56 comprises a plate 59 which has a cam projection 60 formed on the lower edge portion adjacent the right hand end thereof; a centrally located pivot hole 62 in plate 59 registers with a similar hole in the gripper slide 50, the location of which is indicated at 62ᵃ, Fig. 4, and the rear face of the plate 59 is adapted to swing in contact against the front face of the said gripper-slide. An outwardly projecting irregular shaped flange portion 65 is formed integrally with the plate 59 and has an upwardly curved extension 66 at the right which constitutes the upper or movable jaw of the gripper. The member 57 of the gripper consists of a pivot pin 68 of a length sufficient to pass through the pivot hole 62 in plate portion 59 of member 56, and also through the pivot hole in the gripper slide 50 beyond which it is riveted in a manner to secure it against rotation, but to permit the member 56 to freely rock or pivot thereon. The right hand end portion of the member 57 which is formed integral with the above described pivot pin is similar in shape to the portion 65 of member 56, but has a downwardly curved extension 69 at the right which constitutes the lower or stationary jaw of the gripper. A spring 70 is connected to the lower left hand end portion of gripper member 56 and extends to the left to a pin 71 (see Fig. 2) on the gripper slide, and draws the left hand side of member 56 upward and exerts a consequent downward pressure of the movable jaw 66 against the stationary jaw 69. A cam like or inclined edge 60 at the lower right hand portion of member 56 is engaged by the cam abutment 73 on the slide plate 43 (see Fig. 3) and as the gripper slide approaches the end of its traverse to the left opens the grippers to release the label gripped and carried thereby. The said cam 60 is also engaged by the rotating cam 74 on shaft 3 as the gripper slide approaches the end of its traverse to the right. The slight dwell of the gripper slide in this last mentioned position, occasioned by the connection of link 49 with the cam passing the center of its crank-motion, gives the rather rapidly turning cam 74 ample time to engage the cam member 60 and cause an opening and closing of the gripper jaws for the purpose of gripping one end of a pasted label and taking it from its position on the paste supplying platen 20, as will be more fully described later on.

The box-carrier 10, before referred to, and as illustrated in the various figures of the drawing, but more particularly in Figs. 6 to 10 inclusive, consists (as before mentioned) in part in an integrally formed casting comprising the cross head 13 which is secured firmly to the upper end portions of the guide-rods 9,—and the yoke portion 12 projecting from the upper front portion thereof, and arching over the cam-roller 15, which is mounted on the front face of the cross head, and thence downwardly and forwardly in the bracket supported shelf 12$^a$. A block 75 (see Fig. 10$^a$) is secured to the underside of shelf 12$^a$ and may be easily interchangeable for others of greater or less thickness to accommodate boxes of greater or less height. The left hand underside edge portion of this block 75 is rounded or beveled to facilitate the easy entrance of boxes as pushed thereunder from the chute outlet 36 by the shelf block 46 as before described. During the operation of pushing the lowest box of the chute contained column into its position under the block 75 of the box carrier, and while the said box is still supported by the shelf 45, a guiding of the box thereto is provided at its rear by the sheet metal back wall 76 which is secured to the under side of the shelf 12$^a$. The front of the box $x$ as it is moved under the shelf 12$^a$ is engaged by a swinging plate 77 and pressed rearwardly to a position against the back wall 76. This plate 77 has two upwardly extending arms 78, the upper end portions of which are hinge connected to two upwardly and forwardly inclined projections 79 of a bracket plate 80. This bracket plate 80 which is adjustably attached to the top surface of shelf 12$^a$ has a small extended portion on its forward and right hand edge to which is pivotally secured a combined detent 81,—for engaging an edge portion of the swinging plate 77 and holding it in a forward position against the pressure of its spring 82,—and an integrally formed cam 83 which is engaged by a moving box $x$ while the latter is still resting on the shelf 45, and just previous to its completed movement under the blocks of the box carrier.

This engagement of the cam 83 by a box $x$ as described, causes the combined cam 83 and detent 81 to swing on its pivot against the action of spring 83$^a$, thereby carrying detent 81 out of engagement with the edge portion of swinging plate 77, at which time the spring 82 draws the said swinging plate rearwardly into engagement with the box and presses the latter closely between it and the back wall 76. The bottom edge portion of the swinging plate 77 has a narrow shelf portion 77$^a$ formed thereon which swings to a position under the front lower edge of the box $x$ and forms a horizontal support therefor.

The position of the swinging plate relative to the box carrier previous to the transfer of a box from the chute outlet to its position under said box carrier is clearly shown in Fig. 8 of the drawings, and the position of the said parts as last described, i. e. after the release of the swinging plate by its detent 81, is shown in Fig. 6; in the latter figure, however, the box carrier 10 with the spring pressed box (the box being supported also by the swinging plate shelf 77$^a$) is shown as having been slightly raised, and thereby removing the box from its position of rest on the shelf 45. This upward movement of the box carrier, etc. is produced by the engagement of its cam roller 15 by the higher portion 7$^a$ of the cam 7 (see Fig. 2), and the advantage thereof is that by supporting the box out of contact with the box feeding shelf, the latter in its retiring movement to the leftward will have no frictional engagement with the box,—a matter more especially important where the boxes are filled with heavy articles, such, for instance, as cartridges.

At a point directly under the box carrier 10 is a plate or table 85 having a position slightly raised above the bed 1. This table is made in two horizontal, opposite, and edgewise approached, sections which are secured to the bed; and between the approached and grooved edge portions of the two parts of this table 85 is supported and adapted to slide the ejector 86. This ejector which has the form of a narrow bar is formed with a right angular upwardly extending back 87 which is normally in line with, and below, the back wall 76 of the box carrier.

Across the front end portion, and on the under side surface of the ejector is formed a channel or groove 88 (seen in Fig. 1 in dotted lines and in full lines in Fig. 8). This grooved portion of the ejector is engaged by a short stud 89 on one arm of an angle lever 90. This angle lever is pivoted at the front left hand edge portion of the bed 1, and its short arm has a stud 91 formed thereon which is engaged by the forked end of a lever 92, which is pivotally secured to the bed 1 (just to the rear of the pivot of angle lever 90,—see Figs. 1 and 5). The free rearwardly extending end of this lever 92 is in the path of movement of a vertically swinging dog 93 which is mounted on the bracket 44 carried by the slide-plate 43 to the end that during the movement of slide plate 43 to the left the dog 93 engages the free end of lever 92 and swings it also to the left, and by means of the stud and fork engagement of lever 92 with the angle lever 90, and the engagement of the latter as described in the groove 88 of the ejector, causes the latter to move forward, as guided between the adjacent grooved edges of the table 85, all as will be clearly understood from Figs. 1 and 2. As the dog 93 passes to the left beyond the point of engagement with the free arm of lever 92, a spring 94 instantly replaces the levers and ejector to their normal position, which is shown in full lines in Fig. 1. As the slide plate has its reversed, and rightward, movement, the dog pivotally carried thereby incidentally has a swinging motion whereby it clicks by, and assumes its position to the right of the extremity of the free arm of the lever 92.

To the right and left respectively of the position of the box carrier 10 and adjustably secured in such position to the table 85 are the upstanding plates or box-holder walls 95 and 96, the space between said walls being such as to admit of the free entrance from above of a box. Each of the walls 95 and 96 have adjacent their top edge portions two screws 97, which extend outwardly from the box receiving compartment 100 of the said walls, and support loosely thereon the plate portions 98, 99, of the rounded pressure guides 101 and 102 for the label. The rounded and oppositely opposed top-edge surfaces of these guides 101 and 102, normally project slightly within the receiving or box-wrapping compartment 100, and on the entrance therein, from above, of a box $x$ and a carrying downwardly therewith of a label $y$, the guides 101 and 102 just described are crowded backward from over the compartment 100 to the end that the label $y$ is firmly drawn around the bottom and sides of box $x$ (see Fig. 16), said backward pressure being resisted by the springs 103 which are provided on the screws 97 between the heads thereof and the adjacent faces of the plate portions 98, 99. The pasted label $y$ having been wrapped around the three faces of the box as last described, and as illustrated in Fig. 16 of the drawing, leaves the two end portions $u$ and $v$ of the said label standing upward at the right and left hand sides respectively of the box $x$. The means for accomplishing the important operation of folding down these end portions $u$ and $v$ and of sealing the box $x$ by covering over the upwardly presented edges of the inverted box cover $x'$, and the adjacent bottom portion of the inverted inside box $x^2$ by pressing the said pasted label end $u$ and $v$ to and against the upturned bottom portion of the box $x$ until the thorough adhesion of the former to the latter is secured, will now be described.

Secured to the base portion of the right hand section of the box receiving table 85 is a hinge-base 105 to which is hinged the lower extended end of a frame-like lever 106, the upper free ends of which have, hinge connected thereto, the horizontally disposed presser plate 107 which extends from the said point of connection with the lever 106 to the left; and the free end of this plate 107 has formed thereon, or secured thereto, a label engaging end portion which as seen in the drawings (see Figs. 1, 2, 3, 3$^b$ and 8), consists of a sheet metal spring, the curved label-engaging end of which is subdivided into several spring fingers, whereby a more uniform pressure is exerted. An approximately vertical spring 108 connects the plate 107 with a portion of the table 85 and imparts a suitable downward pressure to the spring-finger provided extremity of the presser-plate 107. The rear portion of the lever 106 has a rearwardly extending arm 109, on which is mounted a cam roller 110, which is in line with the path of movement of the working edge of cam 7 (see Figs. 2 and 3$^b$).

A spring 111 is attached by one end to the rear portion of lever 106 and by its other to the right-hand box-holder wall 96, and serves to keep the cam-roller 110 pressed to close engagement against the cam 7, to the end that as the low point 17 of the said cam is presented to the engagement of the cam roller the lever 106 is drawn to the left by its spring 111 and the spring finger end of the presser plate 107 is carried beyond its normal position of rest, as shown in Fig. 2, and is moved over a box $x$, a distance equal to the extension thereover of the label end $u$ (the relation of the parts at the beginning of said movement being shown in dotted lines in Fig. 16). The pasted label end $v$ at the left of the box $x$ is pressed downward onto the box to a sealing position by the spring presser-plate 112, one end of which is attached to the under side of the left-hand end portion of the shelf 45 (see Figs. 1, 2, 3, 15 and 16,) and the free spring end has a curved label-engaging end which on movements to the right of the slide plate 43 which carries shelf 45, carries the finger 112 over the label end $v$ and presses the latter to its sealing position shown by Fig. 9.

The means for applying paste to the top label $y$ of the pile 33 consists of the several coacting parts which will now be described:

The paste receptacle 19, as shown in plan view in Fig. 1 and in end, and sectional, elevation in Figs. 11 to 14 inclusive, consists of an oblong box, preferably of brass, and is removably supported on the opposite end portions of the frame 18 by the screws 120. A slight tilting adjustment of the paste receptacle is provided by the adjusting screw 121 which has a screw-threaded engagement with the projection 122, on the right hand end of the paste-dish to the rear of the supporting screws 120 (see Fig. 11), and which engages and presses upwardly against a portion of the frame 18.

A paste-distributing roller 125 is removably supported within the paste receptacle 19, adjacent the top and front portion of same. At a point slightly above and to either side of the paste-receptacle 19 are the grooved platen guiding supports 127 which are attached to and supported on the upper end portions of the frame 18. The platen 20 consists of an oblong shallow box-like structure whose right and left hand end walls are continued some little distance to the rear and have formed thereon at front and rear the blocks 128, which are adapted to slide forward and rearward in the grooves 129 within the supports 127 and carry the platen 20 from a position over the label pile 33 to a paste supplying position over the distributing roller, and back again. Within the box like platen 20 is provided a rectangular label stripping plate 130. The plate 130 has on the top side, at each end thereof, attached plate sections 131 on which are formed at front and rear thereof the guide pin carrying hubs 132, the downwardly extending guide pins 133 of which (see Fig. 13) enter and are guided in perforations within the half-round projections 134 formed on the platen 20. The label stripping plate 130 has also formed thereon the endwise outwardly extending hubs 136 on the outer ends of which to the right and left hand sides of the platen are mounted the rolls 137. The grooved platen-guiding supports 127 have attached to, or formed on their top surfaces the slightly raised ribs 139, the forward end portions of which are inclined or beveled (as shown at 139ª in Figs. 11 to 14 inclusive).

The label stripping plate has, formed on its underside in the center and at each end thereof the downwardly extending label supporting projections 140, (that is, those to which the labels cohere) and also the downwardly extending pins 141; and the bottom wall of the platen 20 is apertured and perforated to receive and to guide therethrough the above described label projections and pins 140, and 141. (See Figs. 2 and 11 to 14.) A rearward and forward movement to the platen 20 is imparted through the horizontally supported angle lever 145 which is mounted on a vertical stud or post 146 adjacent the rear portion of the bed 1, and at a point thereon between the shafts 3 and 5 (see Figs. 1 and 4).

A link 147 connects the right hand arm of angle-lever 145 with the forward edge portion of the platen 20; the other arm of angle lever 145 which is very short compared to the one first mentioned, has a cam-roller 148 which is engaged by a cam 150,—mounted on a shaft 5,—which is so formed or graded that a comparatively long dwell at the low point of said cam is followed (as a reference to Fig. 4 will indicate), by a quick and somewhat long throw of the lever 145 by the high part of the cam. A stout spring 151 (Fig. 1) keeps roller 148 in contact with the cam 150, and also provides the actuating means for the return forward motion of the platen 20.

A supply of boxes provided within the receiving chute, and the position of the machine being that shown in Figs. 1, 2 and 6 of the drawings (i. e. with a box x shown as having been labeled and sealed and about to be expelled from the position below the box carrier, and to pass down the delivery chute 35ª) and by reason of the moving of the side plate 43 toward the left at this time, the abutment block of the feed shelf 46 is moving to the left and out from under the column of boxes in the receiving hopper 35. The gripper 55 has engaged the left hand end of a paste supplied label which is still supported upon the projection 140 because of the paste on the ends of the latter. The lowest box x of the downwardly moving column within the chute 35 is pushed outwardly to the right, and into the box-carrier 10 by the feed-shelf-block 46 carried by the slide-plate 43.

Just previous to the delivery of the box x into its position fully within the box carrier 10, it engages the cam 83, swinging it forward and thereby forcing the detent 81 from its engagement with the hinged frame 77, which immediately by action of spring 82 swings rearwardly and presses the box between it and the back wall 76. The slight rise 7ª of cam 7 then engages roller 15 and raises carrier 10 slightly above the top surface of the shelf block 46.

Preceding the above described operation of placing a box x within the carrier 10, the platen 20 has traveled to and from its engagement with the paste distributing roller 125, has received a supply of paste thereon, and has, by an upward movement of the elevator 22, been contacted against the top label y of the pile 33, and has retained it in the position shown in Fig. 2, while the balance of the pile 33 has returned downward with the elevator 22, and the gripper 55 has also moved to the right and engaged the platen supported label y. A downward movement of the box carrier 10 is caused by its roller 15 dropping into the depression 17 of cam 7. Near the completion of this downward movement the cam roller 77$^b$ on the hinge plate 77 engages cam 77$^c$ on the box holder wall 95, and swings said hinge-plate 77 from engagement with the box $x$,—Figs. 6, 7 and 8.

It will be understood, referring to Fig. 15, that previous to the descent as just described of the box carrier with the box, a pasted label $y$ has been brought to a position over the receiving compartment 100, and, as shown in Fig. 16, the downward movement of the carrier 10 has brought the box carrier thereby into engagement with the label $y$ and carried it downward into the box receiving compartment 100; during the downward travel of the box $x$ into this last described position, the spring-pressed rounded label folding edges 101 and 102 press the pasted label $y$ into close adhesion with the bottom and sides of the telescoping cover of the box $x$. The movement to the left now of the spring finger 107, by reason of the engagement at this time of the low part 17 of cam 7 with the cam roller 110 acts to fold down the upstanding end $u$ of label $y$ over the edge $x'$ of the box cover and over a portion of the bottom $x^2$ of the box $x$. And a movement now to the right of the slide 43 correspondingly moving the shelf 45, and the spring finger 112 causes the folding down of the upstanding label end $v$ (see Fig. 16) into its sealing position across the box-cover edge $x'$ and onto the upwardly presented box bottom $x^2$. A forward movement of the box ejector 87 is actuated by its lever connections, which are engaged by the dog 93, on the movement to the left of slide 43, and results in expelling box $x$ from compartment 100,—from which it drops into the delivery chute 35$^a$. The box carrier after conveying a box downwardly into the receiver or compartment immediately returns upwardly to receive therewithin another box as brought thereto by the feed shelf so that while the latter is advancing one box into the carrier the devices for overturning and pressing the upstanding extremities of the label are operating on the box in the receiver and below the one being moved into the carrier,—all, of course, before the box to which the label has been applied in encircling relation, is expelled from the box receiving compartment.

In the foregoing description boxes have been referred to as the articles about which the labels have been wrapped, and to which they are adherently secured; but, of course, the machine is applicable for all the uses to which it may be put, irrespective of whether the objects to be operated upon are boxes or something else; and where paste has been mentioned as the adhesive employed for sticking the labels to the box, gum, glue, or other cementatory material may, of course, be employed as having greatest fitness to the purpose.

I claim:—

1. In a machine of the character described, in combination, opposed members having their locations at opposite sides of an upwardly open box receiving compartment, a support for a supply of sheet blanks or labels at one side of said compartment, a feed shelf having a box engaging abutment movably located in a plane above the top of said compartment, opposite from said blank support and means for moving it over and away from over said compartment, means for guiding boxes onto said feed shelf, a frame-like box carrier normally above said compartment and comprising rear and front members one of which is movable toward and from the other and one of said members having an extension for engagement under the lower edge portion of the box, a detent for temporarily maintaining the movable box carrier member in its opened relation preparatory to receiving a box therewithin and having a position whereby on the entrance of the box within the carrier said detent will be released to permit the movable carrier member to close and engage the box, means for transferring a blank from the supply support across the top of said compartment, means for imparting a downward movement to the carrier for conveying the box downwardly into said compartment and to transform the blank thereunder to U form and an upward return movement, and devices for folding the extremities of the blank upstanding at either side above the box onto the top of the latter.

2. In a machine of the character described, the combination with walls at opposite sides of a box receiving compartment, of a box-carrier normally above the compartment, a feed shelf horizontally movable above said compartment, means for reciprocating the feed shelf to push a box within the carrier, means operative firstly to elevate the carrier for positioning the box clear of the feed shelf on the retiring movement of the latter, to furthermore cause a descending movement of the carrier for conveying the box within the compartment and for thereafter upwardly returning the carrier to its normal position above the compartment.

3. In a machine of the character described, in combination, walls at opposite sides of an upwardly open box receiving compartment, a box carrier comprising front and rear vertical members, one of which is movable for an increased separation relatively to the other and having a box engaging projection, means for imparting a closing force to the movable member, means for feeding boxes horizontally above the top of the compartment into said carrier, a detent mounted on the carrier for normally maintaining the movable member in its opened position and having a member to be engaged for releasing the detent on the entrance of a box into the carrier, and means for imparting downward and returning upward movements to the carrier.

4. In a machine of the character described, in combination, walls at opposite sides of an upwardly open box receiving compartment, a box carrier comprising front and rear vertical members, one of which is movable for an increased separation relatively to the other and having a box engaging projection, means for imparting a closing force to the movable member, means for feeding boxes horizontally above the top of the compartment into said carrier, a detent mounted on the carrier for normally maintaining the movable member in its opened position having a member to be engaged for releasing the detent on the entrance of a box into the carrier, means for imparting downward and returning upward movements to the carrier, and a cam operative on the movable carrier member for opening the latter as the carrier arrives at a lowered position relatively to the box receiving compartment.

5. In a machine of the character described, in combination, walls inclosing a box receiving compartment, a box carrier comprising a top and rear and front substantially vertical members, the front member being pivotally connected to and depending from the top and provided at its lower extremity with a cam engagement projection, a spring, for imparting a closing movement to the said pivoted front member, a spring pressed detent pivotally connected on the top of the box carrier and provided with a releasing member, means for feeding boxes within the carrier, means for imparting downward and returning upward movements to the carrier and a part having a cam or inclined face adjacent the front of the box receiving compartment with which said projection of the movable carrier member coacts in the descent of the carrier.

6. In a machine of the character described, in combination, vertical walls, located at opposite sides of a box receiving compartment, comprising members at their upper portions which extend inwardly beyond the inner faces of said walls, and are yieldable in directions away from each other, means for conveying boxes horizontally over the compartment, a box carrier having a position normally above the compartment and comprising a top member and depending rear and front members, one of the latter being transversely yieldingly movable and provided at its lower edge with a box engaging lip, mechanism for positioning labels across the top of said compartment and means for imparting vertical reciprocatory movements to the box carrier whereby in descending, and bodily supporting and moving the box, the latter will, in coming into the compartment, be forced by the said top of the carrier, overcoming the pressure of the yieldable members at the opposite sides of the compartment.

7. In a machine of the character described, walls at opposite sides of an upwardly opening and also a forwardly opening box receiving compartment, an ejector slide movable transversely at the base of said compartment and having at its rear an upstanding box engaging member, means for positioning labels over the compartment, a box carrier above the compartment, means for horizontally moving the box into the box carrier, means for imparting vertically reciprocatory movements to the box carrier, and means for imparting reciprocatory movements to the ejector slide.

8. In a machine of the character described, upstanding walls at either side of the upwardly and also forwardly opening box receiving compartment, a slide transversely movable in the base of said compartment having in its rear an upwardly extending box engaging member, a box carrier normally above the compartment and means for moving it downwardly and returning it upwardly, a feed shelf and means for imparting a reciprocatory movement thereto horizontally at a level above the compartment, a lever device having an engagement with the ejector slide and a dog movable in unison with the feed shelf and operative to periodically engage said lever device for actuating the ejector.

9. In a machine of the character described, upstanding opposed walls at opposite sides of a box receiving compartment and a bar slidably guided in the base of said compartment having a transverse groove in its forward extremity and an upstanding member at its rear portion, a pivoted elbow lever provided with a stud engaging in said groove, another lever intermediately pivoted having one arm engaging the first named lever and its other arm rearwardly extended, a slide carrying a feed shelf movable horizontally, and means for reciprocating it, and a dog pivotally mounted on the latter slide and movable into a path intersecting the extremity of said second named lever.

10. In a machine of the character described, in combination, separated upstanding walls at opposite sides of a forwardly and upwardly open box compartment, means for positioning a label across the top of said compartment, a feed shelf for moving a box to a position directly above the compartment, a box carrier normally above the compartment into which the box is delivered by the feed shelf, means for moving the carrier downwardly and upwardly returning it, an ejector for expelling a box forwardly from the compartment and a member carried by and having its position below the feed shelf for engaging an upstanding extremity of a label and for folding and pressing it on the top of a box in the compartment while such shelf is moving another box into the box carrier 11. In a machine of the character described, in combination, separated upstanding walls at opposite sides of the forwardly and upwardly open box receiving compartment, means for positioning a label across the top of said compartment, a feed shelf above and normally to one side of the compartment for moving the box to a position over the latter, a box carrier normally above the compartment into which the box is delivered by the feed shelf, means for moving the carrier downwardly, and upwardly returning it, a member carried by and having its position below the feed shelf for engaging one upstanding extremity of a label and for folding and compressing it on the top of a box in the compartment, a device, located at the side of the compartment opposite the location of the feed shelf for engaging the other upstanding extremity of a label and for folding and compressing it on the top of a box in a compartment, and means for operating said last mentioned folding device.

12. In a machine of the character described, in combination, walls at opposite sides of an upwardly open box receiving compartment, means for positioning a label across the top of the compartment, a vertically movable box carrier normally above the compartment, and a horizontally reciprocatory feed shelf normally to one side of the compartment, operating above the top of the latter and having at its under side a downwardly deflected spring plate, an upstanding rocking lever pivotally mounted at its lower portion, at the side of the compartment opposite that at which the feed shelf is located, a label folding and pressing device pivoted to the upper end of the lever, a spring operative to impart a swinging movement to the lever in a direction across the top of the compartment, means for imparting a downward pressure to the folding and pressing device, a cam for forcing the lever in a direction opposite that of the stress of said spring, and means actuated by said cam for imparting the reciprocatory movements to the feed shelf.

13. In a machine of the character described, in combination, walls at opposite sides of an upwardly open box receiving compartment, a vertically movable box carrier normally above said compartment, a feed shelf normally to one side of the compartment and movable horizontally above the top of the latter for pushing boxes into the carrier, a horizontal slide on which the feed shelf is mounted, a revoluble cam, a member appurtenant to the vertically movable box carrier in engagement with said cam, a link pivotally connected to the body of said cam and to the feed shelf slide, and means for variably adjusting the point of pivotal connection of said link with said cam.

14. In a machine of the character described, in combination, walls at opposite sides of an upwardly open box receiving compartment, means for positioning a label across the top of the compartment, a vertically movable box carrier normally above said compartment, a feed shelf normally to one side of the compartment and movable horizontally above the top of the latter for pushing boxes into the carrier, said feed shelf carrying a label folding and pressing device, mechanism for imparting a reciprocatory movement to the feed slide, comprising a revoluble cam, a member appurtenant to the vertically movable box carrier in engagement with said cam, and a second label-folding and pressing device, having its location at the side of the compartment opposite that of the feed shelf, operated by the box carrier actuating and feed shelf actuating cam.

15. In a machine of the character described, in combination, walls at opposite sides of an upwardly open box receiving compartment, a movable box carrier normally above said compartment, having downwardly, and upwardly returning, movements, a feed shelf normally to one side of the compartment and movable horizontally above the top of the latter for pushing boxes into the carrier, mechanism for imparting a reciprocatory movement to the feed shelf comprising a revoluble cam, a member appurtenant to the vertically movable box carrier in engagement with said cam, a support for a supply of labels, means for successively elevating said support to raise the labels to a given height, actuated by the same cam, and a label gripping device movable for engaging an elevated label, for drawing it across the top of the compartment, and for releasing the label, means for imparting the bodily movements to the gripper, and means for operating the gripper while at its opposite locations.

16. In a machine of the character described, in combination, walls at opposite sides of an upwardly open box receiver, a movable box carrier normally above said receiver, having downwardly, and upwardly returning, movements, a feed shelf normally to one side of the receiver and movable horizontally above the top of the latter for pushing boxes into the carrier, mechanism for imparting a reciprocatory movement to the feed shelf comprising a revoluble cam, a member appurtenant to the vertically movable box carrier in engagement with said cam, a support for a supply of labels, means for successively moving said support to position a label to be used at a given height, a label gripping device comprising a fixed and a movable jaw, said device being movable for engaging the label, and drawing it across the top of the receiver, means for imparting the bodily movements to the gripper, a rotary cam to the jaw opening action of which the gripper is brought preparatory to grasping a label, and a fixed member to engagement with which the movable jaw of the gripper is brought in the other extreme of its movement.

17. In a machine of the character described, in combination, separated members at opposite sides of a box receiver, a support for a supply of labels at one side of the receiver, and a reciprocatory feed shelf at the other side of and movable to a position over the receiver, means for moving it to and returning it from such position, a bar slidable along and in the same direction with the feed shelf carrying at its extremity a label gripper which normally is disposed at the same side of the receiver as the feed shelf and means for imparting concurrently with the movement of the feed shelf a faster and more extended movement of the gripper bar whereby the latter is projected from a position adjacent the feed shelf and to one side of the receiver to a position beyond the opposite side of the receiver, and then back again, for grasping and drawing a comparatively long label horizontally over the top of the receiver.

18. In a machine of the character described, in combination, a feed shelf and a horizontally movable slide on which it is mounted having a gear wheel journaled thereon, a fixed horizontal rack with which said gear wheel meshes at its one edge portion, means for positively imparting an endwise movement to the feed shelf slide, a gripper carrying bar provided with rack teeth with which the other edge portion of said gear wheel meshes whereby the bodily movement of the gear wheel imparted thereto by the slide on which it is mounted will cause a rotative movement of such gear-wheel for transmitting sliding movements of the gripper slide with greater speed and in longer extents concurrently with and in directions corresponding to the movements of the feed shelf slide.

19. In a machine of the character described, in combination, a box receiver, a feed shelf normally to one side of, and horizontally movable over the receiver, and a horizontally movable slide on which the feed shelf is mounted having a gear wheel journaled thereon, to rotate in a vertical plane, a fixed horizontal rack with which said gear wheel meshes at its under portion, means for positively imparting endwise movements to the feed shelf slide, a gripper carrying bar provided with rack teeth with which the upper edge portion of said gear-wheel,—bodily carried on the feed shelf slide,—meshes, a support for labels, means for maintaining the gripper normally closed, and means for opening the gripper when at both extremes of its movements, and means for conveying a box horizontally positioned by the feed shelf over the receiver downwardly into the latter.

20. In a machine of the character described, in combination, the machine-frame, a feed-shelf, and a horizontally movable slide guided on the frame, on which slide the feed shelf is mounted, and said slide having a gear wheel journaled thereon, a horizontal rack fixed on the frame with which said gear wheel by its one edge portion meshes, a revolving element, and a link connecting said revolving element and the feed shelf slide, a gripper carrying bar provided with rack teeth with which the other edge portion of said gear wheel meshes, a box receiver, a chute for guiding boxes onto the feed shelf, a box conveyer to which the boxes are moved by the feed-shelf, and by which they are moved into the box receiver, and means for periodically actuating the box conveyer.

21. In a machine of the character described, in combination, a box receiver, a feed shelf normally to one side of, and horizontally movable over the receiver, and a horizontally movable slide on which the feed shelf is mounted having a gear wheel journaled thereon, to rotate in a vertical plane, a fixed horizontal rack with which said gear wheel meshes at its under portion, a revoluble element, a link connected to said revoluble element and to the feed shelf slide, a gripper carrying bar provided with rack teeth with which the upper edge portion of said gear-wheel,—bodily carried on the feed shelf slide,—meshes, a support for labels, means for maintaining the gripper normally closed, means for opening the gripper when at both extremes of its movements, and means for conveying a box horizontally positioned by the feed shelf over the receiver downwardly into the latter.

22. In a box labeling machine, in combination, an upwardly open receiver into which boxes or like objects are to be brought, a support for a pile of labels located at one side of the receiver, a platen above the label support, respectively provided means for applying an adhesive onto the under side of the platen,—for elevating the support whereby the top label may contact against and adhere to the platen,—for stripping the label from the platen and supporting it in separated relation thereto,—for conveying the label across the top of the box receiver,— for moving a box downwardly into the receiver whereby the same becomes partially encircled by the gummed label, and for folding and pressing the extremities of the label onto the box.

23. In a box labeling machine, in combination, an upwardly open receiver into which boxes or like objects are to be brought, which also is sidewise open, and having a box ejector and means for periodically operating it, a support for a pile of labels located at one side of the receiver, a platen above the label support, respectively provided means for applying an adhesive onto the under side of the platen,—for elevating the support whereby the top label may contact against and adhere to the platen,—for stripping the label from the platen and supporting it in separated relation thereto,—for conveying the label across the top of the box receiver,—for moving a box downwardly into the receiver whereby the same becomes partially encircled by the gummed label, and for folding and pressing the extremities of the label onto the box.

24. In a box labeling machine, in combination, an upwardly open receiver into which boxes or like objects are to be brought, a support for a pile of labels located at one side of the receiver, a platen normally above the label-support, an adhesive supplying roll and respective means for moving the platen across said roll and back to its position over said support,—for elevating the support relatively to the platen,—for stripping the label from the platen and for supporting it in separated relations thereto,—for conveying the label across the top of the box receiver,—for moving a box downwardly into the receiver whereby the same becomes partially encircled by the label,—and for folding and pressing the extremities of the label onto the box.

25. In a box labeling machine, in combination, an upwardly opening receiver into which boxes or like objects are to be brought, a support for a pile of labels located at one side of the receiver, a horizontal platen above the label-support having apertures therethrough, a plate above the platen provided with depending stud-like stripper members depending through the platen, respective means for gumming the under side of the platen, and the lower ends of said stripper members, for elevating the label support whereby the top label may contact against and adhere to the platen, and said members depending therethrough,—for acquiring relatively a depression of the stripping members below the platen,—for conveying the label across the top of the box receiver,—for moving a box downwardly into the receiver,—and for folding and pressing the extremities of the label onto the box.

26. In a box labeling machine, in combination, an upwardly opening receiver for boxes or the like, a support for a pile of labels located at one side of the receiver, a horizontally movable platen above the label support provided with apertures, a plate above the platen having depending stud-like members projecting through said platen apertures, an adhesive supplying roll to the rear of the platen, means respectively for moving the platen onto and across said roll and returning it to its position above said support,—for elevating said plate relatively to the platen whereby its depending members will be positioned substantially flush with the under surface of the platen during the traverse of the latter across said roll,—for elevating the label support relatively to the platen,—for conveying the label across the top of the box receiver and for moving a box downwardly into the receiver.

27. In a box labeling machine, in combination, an upwardly opening receiver for boxes or the like, a support for a pile of labels located at one side of the receiver, a horizontally movable platen above the label support provided with apertures, a plate above the platen having depending stud-like members projecting through said platen apertures, an adhesive supplying roll to the rear of the platen, means respectively for moving the platen onto and across said roll and returning it to its position above said support,—for elevating said plate relatively to the platen whereby its depending members will be positioned substantially flush with the under surface of the platen during the traverse of the latter across said roll,—for elevating the label support relatively to the platen,—for conveying the label across the top of the box receiver,—for moving a box downwardly into the receiver,—for imparting a pressure sidewise across the label during the descent of it and the box into the receiver,—and for overturning and pressing the extremities of the label onto the top of the box.

28. In a labeling machine, in combination, an upwardly opening box receiver, a support for a pile of blanks to one side thereof, a platen to one side of said support provided with a series of vertical apertures therethrough, a gravitative plate above the platen having members depending through the apertures of the platen, an adhesive supplying roll located at the rear of the platen, a cam operated lever connected to the platen, and operative to move the latter in contact across said roll and back to its position above the support, means for elevating said gravitative plate relatively to the platen while the latter is in its traverse across said roll, means for imparting an upward movement of the label support relatively to the platen and a returning downwardly retiring movement therefrom, a gripper for grasping the label and for drawing it across the box receiver, means for moving a box downwardly into the receiver, and means for overturning and pressing the upstanding extremities of the label onto the top of the box.

29. In a labeling machine, in combination, an upwardly opening box receiver, a vertically movable blank pile support to one side of the receiver, a horizontal platen, above said support, provided with vertical apertures therethrough, fixed upstanding ribs at opposite sides of the platen having cam inclined extremities, a plate above the platen, provided with depending members extending through the apertures of the platen and having members in engagement with said ribs with the inclined extremities, a cam, an elbow lever, one arm of which is engaged by the cam and with the other arm of which a link is connected and which also has connection with a platen, an adhesive supplying roll to the rear of the platen, means for moving the label support upwardly relatively to the platen and for downwardly retiring it, means for grasping and carrying a label adherent on the depending projections of said plate below the platen across the box receiver, means for moving a box downwardly into the receiver, and means for overturning and pressing the upstanding edges of the label onto the top of the box.

30. In a machine of the character described, in combination, an upwardly open box receiver, a feed shelf normally at one side of the receiver, means for moving the feed shelf horizontally over and away from over the receiver, a box conveyer normally above the receiver and means for moving it downwardly relatively to the latter and for upwardly retiring it, a label folding and pressing device carried by the feed shelf, a second label folding and pressing device at the opposite side of the receiver from the location of the feed shelf, a platen above the label support movable rearwardly and forwardly relatively thereto, and means for imparting its movements thereto, an adhesive supplying roll to the rear of the platen relatively to which the latter is moved, a label stripper appurtenant to the platen and comprising members depending through the latter, and means for imparting vertical movements of the stripper relatively to the platen, means for elevating the label pile support relatively to the platen and returning it downwardly away therefrom, a gripper carrying bar movable in conjunction with the feed shelf and means for imparting movements to said bar at faster speed and in longer extents than those imparted to the feed shelf, for the purposes set forth.

Signed by me at Springfield, Mass., in presence of two subscribing witnesses.

FREDERICK COATES.

Witnesses:
WM. S. BELLOWS,
G. R. DRISCOLL.